(12) United States Patent
Orhan (10) Patent No.: US 12,095,814 B2
(45) Date of Patent: Sep. 17, 2024

(54) PHISHING WEBSITE DETECTION BY CHECKING FORM DIFFERENCES FOLLOWED BY FALSE CREDENTIALS SUBMISSION

(71) Applicant: NuRD LLC, Bloomfield, NJ (US)

(72) Inventor: Fatih Orhan, Cedar Grove, NJ (US)

( * ) Notice: Subject to any disclaimer, the term of this patent is extended or adjusted under 35 U.S.C. 154(b) by 0 days.

(21) Appl. No.: 17/675,982

(22) Filed: Feb. 18, 2022

(65) Prior Publication Data
US 2022/0174093 A1 Jun. 2, 2022

Related U.S. Application Data

(62) Division of application No. 16/544,865, filed on Aug. 19, 2019, now Pat. No. 11,297,101.

(60) Provisional application No. 62/721,520, filed on Aug. 22, 2018.

(51) Int. Cl.
H04L 9/40 (2022.01)

(52) U.S. Cl.
CPC ...... *H04L 63/1483* (2013.01); *H04L 63/1416* (2013.01)

(58) Field of Classification Search
CPC .................. H04L 63/1483; H04L 63/1416
USPC ........................................................ 726/23
See application file for complete search history.

(56) References Cited

U.S. PATENT DOCUMENTS

| 7,634,810 | B2 | 12/2009 | Goodman et al. | |
|---|---|---|---|---|
| 7,854,001 | B1 | 12/2010 | Chen et al. | |
| 7,925,883 | B2 | 4/2011 | Florencio et al. | |
| 8,566,938 | B1 | 10/2013 | Prakash et al. | |
| 9,027,126 | B2 | 5/2015 | Larkins | |
| 9,230,105 | B1 * | 1/2016 | Satish | G06F 21/56 |
| 9,843,602 | B2 | 12/2017 | Tsao et al. | |
| 10,652,277 | B1 * | 5/2020 | Venkatesan | G06F 40/14 |
| 10,834,128 | B1 * | 11/2020 | Rajagopalan | H04L 51/212 |
| 2006/0080735 | A1 | 4/2006 | Brinson et al. | |
| 2007/0250920 | A1 * | 10/2007 | Lindsay | G06F 21/31 726/7 |

(Continued)

FOREIGN PATENT DOCUMENTS

KR       20080111310 A   * 12/2008  ............. G06F 21/00

OTHER PUBLICATIONS

Ndibwile et al., "UnPhishMe: Phishing Attack Detection by Deceptive Login Simulation through an Android Mobile App," 2017 12th Asia Joint Conference on Information Security (AsiaJCIS), 2017, pp. 38-47, doi: 10.1109/AsiaJCIS.2017.19. (Year: 2017).*

(Continued)

*Primary Examiner* — Peter C Shaw
(74) *Attorney, Agent, or Firm* — Joseph P. Aiena (57) ABSTRACT

There is provided a method to detect phishing websites so as to protect users from sending their sensitive information to criminal servers. When browsing a web site having an input form asking sensitive information, the input fields are recorded (i.e. username field and password field). Then false credentials are generated and submitted in background. The new control layer then checks the response page content whether it includes an input form and if there is an input, it checks whether the form has the same fields as the first form. If the responded page does not have a form, or it has a form but includes different fields than the initial page's form, then the original site is identified as phishing.

4 Claims, 6 Drawing Sheets

(56) References Cited

U.S. PATENT DOCUMENTS

| | | | | |
|---|---|---|---|---|
| 2009/0006861 | A1* | 1/2009 | Bemmel | H04L 63/083 |
| | | | | 713/189 |
| 2009/0228780 | A1* | 9/2009 | McGeehan | G06F 21/55 |
| | | | | 726/4 |
| 2010/0175136 | A1 | 7/2010 | Frumer et al. | |
| 2011/0126289 | A1 | 5/2011 | Yue et al. | |
| 2013/0185802 | A1* | 7/2013 | Tibeica | G06F 21/577 |
| | | | | 726/26 |
| 2014/0359760 | A1* | 12/2014 | Gupta | H04L 63/1483 |
| | | | | 726/22 |
| 2015/0074390 | A1* | 3/2015 | Stoback | H04L 63/1483 |
| | | | | 713/156 |
| 2017/0099319 | A1 | 4/2017 | Hunt et al. | |
| 2017/0244755 | A1* | 8/2017 | Tsao | G06F 21/44 |
| 2018/0007066 | A1 | 1/2018 | Goutal | |
| 2018/0077199 | A1* | 3/2018 | Tsao | G06F 21/44 |
| 2019/0068638 | A1* | 2/2019 | Bartik | H04L 63/1483 |
| 2019/0104154 | A1* | 4/2019 | Kumar | G06N 20/00 |
| 2020/0204587 | A1* | 6/2020 | Hunt | G06F 21/128 |
| 2021/0160280 | A1* | 5/2021 | Yadav | G06F 18/24137 |

OTHER PUBLICATIONS

Mondal et al., "A Review on Detecting Phishing URLs using Clustering Algorithms," 2019 International Conference on Advances in Computing, Communication and Control (ICAC3), 2019, pp. 1-6, doi: 10.1109/ICAC347590.2019.9036837. (Year: 2019).*

Gastellier-Prevost et al., "Decisive Heuristics to Differentiate Legitimate from Phishing Sites," 2011 Conference on Network and Information Systems Security, 2011, pp. 1-9, doi: 10.1109/SAR-SSI.2011.5931389. (Year: 2011).*

Faris et al., "Phishing Web Page Detection Methods: URL and HTML Features Detection," 2020 IEEE International Conference on Internet of Things and Intelligence System (IoTalS), Bali, Indonesia, 2021, pp. 167-171, doi: 10.1109/IoTalS50849.2021.9359694. (Year: 2021).*

Ndibwile et al., "UnPhishMe: Phishing Attack Detection by Deceptive Login Simulation through an Android Mobile App," 2017 12th Asia Joint Conference on Information Security (AsiaJCIS), Seoul, Korea (South), 2017, pp. 38-47, doi: 10.1109/AsiaJCIS.2017.19. (Year: 2017).*

Belabed et al., "A Personalized Whitelist Approach for Phishing Webpage Detection," 2012 Seventh International Conference on Availability, Reliability and Security, Prague, Czech Republic, 2012, pp. 249-254, doi: 10.1109/ARES.2012.54. (Year: 2012).*

Mondal et al., "A Review on Detecting Phishing URLs using Clustering Algorithms," 2019 International Conference on Advances in Computing, Communication and Control (ICAC3), Mumbai, India, 2019, pp. 1-6, doi: 10.1109/ICAC347590.2019.9036837. (Year: 2019).*

Buber et al., "Feature selections for the machine learning based detection of phishing websites," 2017 International Artificial Intelligence and Data Processing Symposium (IDAP), Malatya, Turkey, 2017, pp. 1-5, doi: 10.1109/IDAP.2017.8090317. (Year: 2017).*

Skula et al., "Domain Blacklist Efficacy for Phishing Web-page Detection Over an Extended Time Period," 2023 33rd Conference of Open Innovations Association (FRUCT), Zilina, Slovakia, 2023, pp. 257-263, doi: 10.23919/FRUCT58615.2023.10142999. (Year: 2023).*

K. Kumar and K. Alekhya, "Detecting Phishing Websites Using Fuzzy Logic," International Journal of Advanced Research in Computer Engineering & Technology (IJARCET), vol. 5, Issue 10, Oct. 2016.

M. Aburrous, et. al., "Intelligent Detection System for E-Banking Phishing Websites Using Fuzzy Data Mining," Expert Systems With Applications 37, pp. 7913-7921, 2010.

L. Wenyin, et. al., "Phishing Web Page Detection," Document Analysis and Recognition, 2005.

S. Afroz and R. Greenstadt, "Phizhzoo: An Automated Web Phishing Detection Approach Based on Profiling and Fuzzy Matching," Drexel University, Tech. Rep., Mar. 2009.

S. Abu-Nimeh, et. al., "A Comparison of Machine Learning Techniques for Phishing Detection," Proceedings of the Anti-Phishing Working Groups 2nd Annual eCrime Researches Summit, pp. 60-69, Oct. 2007.

A. Jain and V. Richariya, "Implementing a Web Browser With Phishing Detection Techniques," World of Computer Science and Information Technology Journal (WCSIT), vol. 1, No. 7, 289-291, 2011.

A. Bergholz, et. al., Improved Phishing Detection Using Model-Based Features. In CEAS, 2008.

G. Ehringer and P. A. Barrachlough, "Intelligent Security for Phishing Online Using Adaptive Neuro Fuzzy Systems," (IJACSA), International Journal of Advanced Computer Science and Applications, vol. 8, No. 6, 2017.

Gajek S., Sadeghi AR. (2008) A Forensic Framework for Tracing Phishers. In: Fischer-Hubner S., Duquenoy P., Zuccato A., Martucci L. (eds.) The Future of Identity in the Information Society. Privacy and Identity 2007. IFIP—The International Federation for Information Processing, vol. 262, Springer, Boston MA.

H. Shahriar and M. Zulkernine, "PhishTester: Automatic Testing of Phishing Attacks," 2010 Fourth International Conference on Secure Software Integration and Reliability Improvement, 2010, pp. 198-207, doi:10.1109/SSIRI.2010.17.

* cited by examiner

Well-known Website Logon

Https//phishywebsitename

Well-known Website Name

Secure Log on

User ID

Password

☐ Remember my User ID

Forgot your User ID and Password?

( Log on )

FIG. 3D

Bitcoin Wallet - Well-known Website

Https//bitckchain.pw/wallet/#/login

Well-known Website Name

Welcome Back!  Or Sign up
Sign in to your wallet below

Wallet ID

Password

LOG IN

Log in via Mobile   Having some trouble? View Options

PHISHING WEBSITE DETECTION BY CHECKING FORM DIFFERENCES FOLLOWED BY FALSE CREDENTIALS SUBMISSION

CROSS REFERENCE TO RELATED APPLICATIONS

This application is a divisional of and claims the benefit of and priority to U.S. patent application Ser. No. 16/554,865, filed on Aug. 19, 2019, which claims the benefit of and priority to U.S. Provisional Patent Application No. 62/721,520, filed on Aug. 22, 2018, each of which are incorporated by reference herein in their entirety.

BACKGROUND

Phishing is performed in many different ways and one of the major targets of this act is to steal user's sensitive information. The simple scenario for this malicious act is like: a phishing website pretends to be a reputable web site and requests sensitive information from the user (email, username & password, credit card information, SSN number etc.) The user provides the requested information and submits it, without knowing the site is fake. The user sensitive data is sent to criminals and information is utilized for malicious purposes.

Current techniques to detect phishing web pages are using several features of web pages such as URL syntax, DOM tree layout similarity, JavaScript codes, page style, domain identity, etc. There are also other methods that use features from email messages that contain URL itself and try to classify URL according to features extracted from email.

There are also methods that use whitelisting and blacklisting based approaches to detect phishing sites. These lists of malicious and safe web sites are being generated with either human validation or using simple rules, and when a web site is found in phishing blacklist, it is immediately marked as phishing and blocked by any protection component.

Disadvantage of blacklisting and whitelisting approach is its lack of zero-day phishing detection capability. When user browses a web page that is not either in blacklist or in whitelist, these techniques are unable to provide a classification result to user, and if this unknown web page is phishing it misses the detection. Other heuristic techniques have no interaction with the unknown page and use only static features of it trying to use similarity properties and various anomalies to classify unknown pages. This approach has potential to detect phishing pages up to some point though it is unable to catch and analyze behavior of unknown site according to user actions.

Thus there is need in new method for thorough and effective detection of phishing web sites before user submits sensitive information to malicious third parties.

SUMMARY OF THE INVENTION

The current invention is a method to detect phishing websites so to protect users from sending their sensitive information to criminal servers.

According to the present invention, when user browses a web site having an input form asking sensitive information, the input fields are being recorded (i.e. username field and password field). Then false credentials are being generated and submitted in background. Afterwards the new layer checks the response page content, whether it includes an input form and if there is an input, it checks whether the form has the same fields as the first form. If the responded page does not have a form, or it has a form but includes different fields than the initial page's form, then the original site is identified as phishing.

Invention method triggers interaction with web page and analyzes its behavior before actual real user interaction. This allows more enhanced phishing site detection, compared to existing techniques, that is capable to detect zero-day phishing web pages. This way the users are protected from these phishing websites and their sensitive data are not submitted to criminals' servers.

The system would limit the user when a website is not in whitelist but actually is not a phishing website and legit in all means. Since the proposed layer sends fake/random data to the legit website, the usability is affected. To overcome this, the users are enabled with a permissive functionality having "Allow this website" button after the fake data have been submitted once. That usability is helpful if users would want to be protected than to be sorry.

Nowadays every web browser has its own browser extension capability and lets developers to develop and publish any kind of browser extension. Proposed method is ideal to implement as a web browser extension and usable in real time while users are browsing any web page. It is possible to interact with web page's input forms in background and analyze response content invisible for user.

DETAILED DESCRIPTION

The present invention discloses the method of phishing website detection by checking form differences followed by false credentials submission. The detection is implemented by introducing a control layer between the user and the website to be visited, so that proposed new layer can check whether the page requiring sensitive information is a phishing web site by comparing the initial page with input form and the response page after false credential submission.

Figure 1:
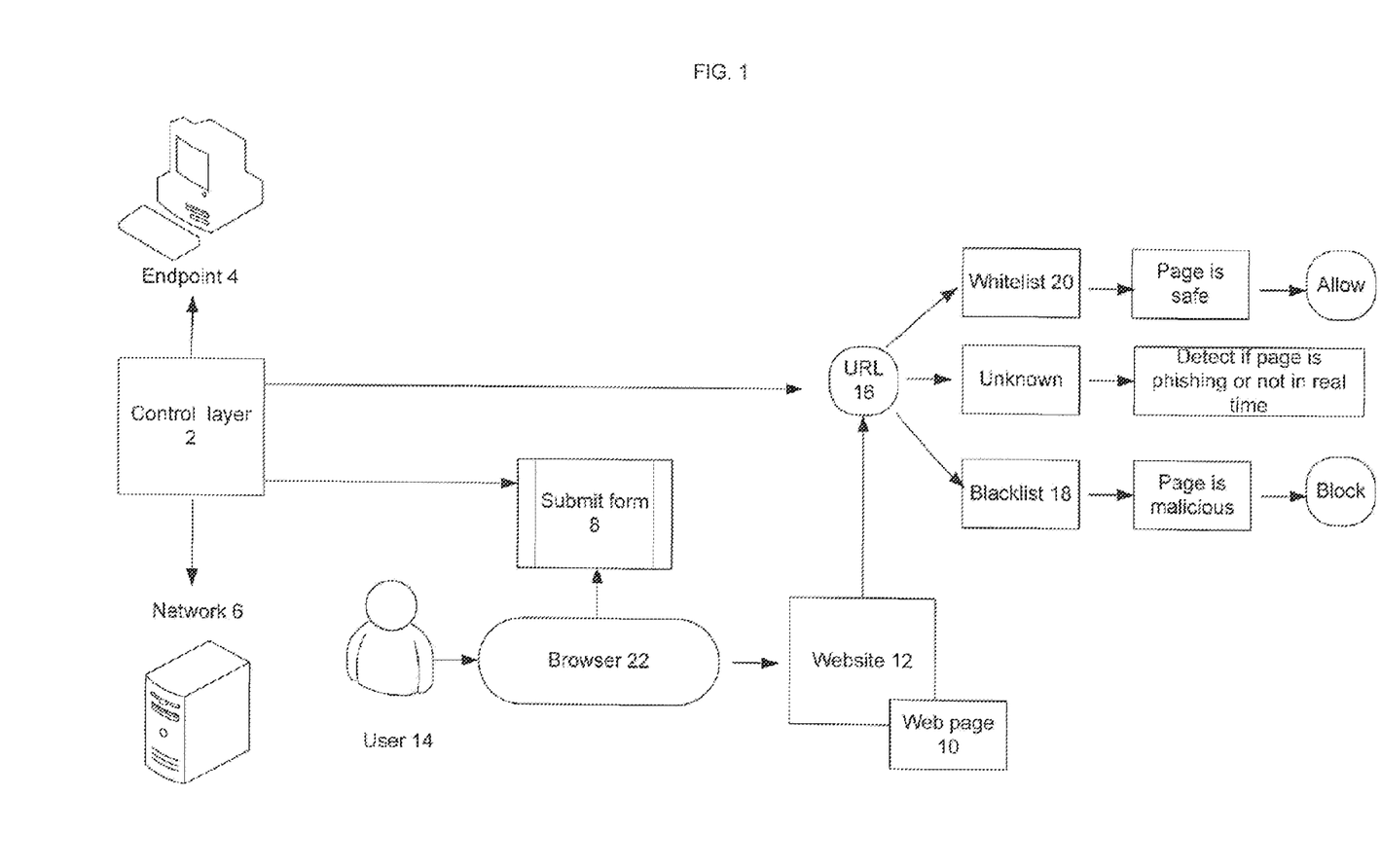
FIG. 1 is a depiction of general scheme of the invention.

FIG. 1 depicts a general scheme of the invention. There is a system of the control layer 2 deployed on endpoint 4 or on network 6 and tracking submit form 8 existence of the web page 10 of web site 12 being visited by users 14. End user 14 browses web pages 10 of web sites 12 and interacts with them, visiting web page URL 16. Further the control layer 2 checks whether URL 16/domain being browsed in either in blacklist 18 or in whitelist 20. If web page 10 is found in whitelist 20 it is safe. If web page 10 is found in blacklist 18, it is malicious. If web page 10 exists neither in whitelist 20 nor in blacklist 18, it is unknown. The control layer 2 may allow interaction of the user 14 with the web site 12 or the control layer 2 may block access to web page content and warn the user 14 about malicious content. Although the user 14 may force continue browsing the web page 10.

Figure 2:
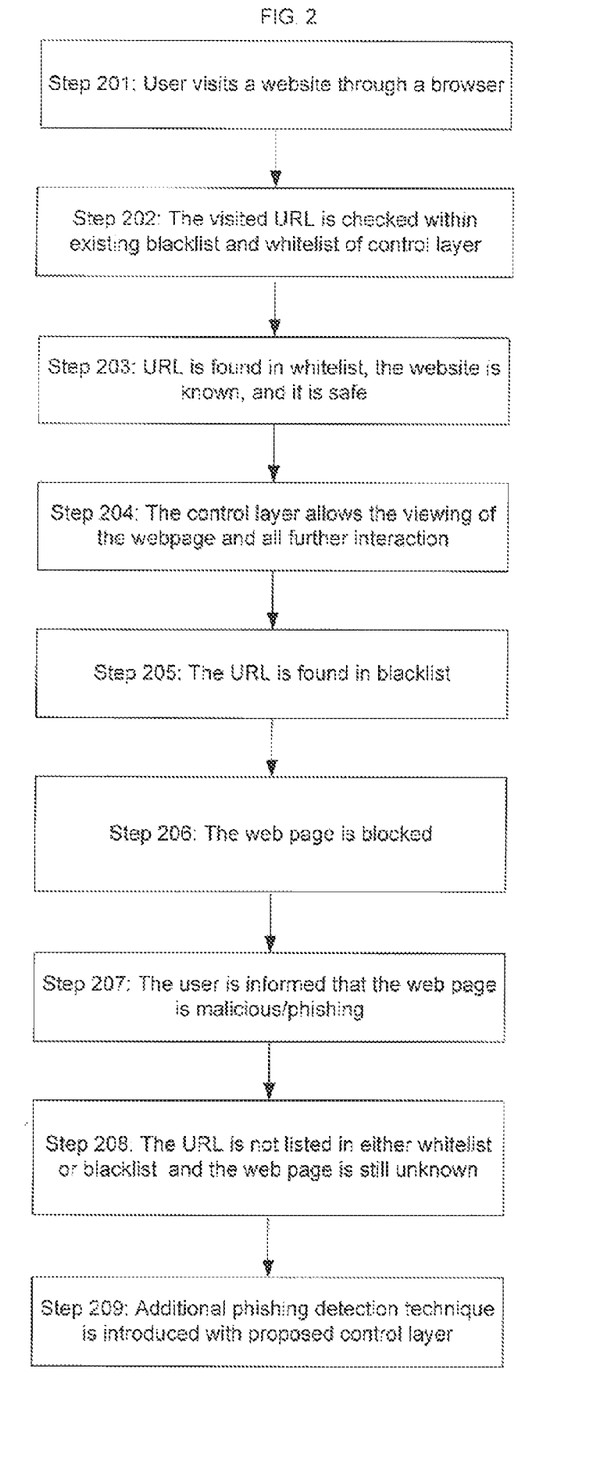
FIG. 2 is a flowchart of one embodiment of the invention where initial phishing detection steps are taking place.

FIG. 2 is a flowchart of one embodiment of the invention where initial phishing detection steps are taking place. In step 201 the user 14 visits the website 12 through the browser 22. In step 202 the visited URL 16 is checked within existing blacklist 18 and whitelist 20 of the control layer 2. There are three different possible values for the web page 10 being visited: URL 16 is in whitelist 20, in blacklist 18, URL 16 is neither of the list, thus it is unknown. In step 203 URL 16 is found in whitelist, so the website 12 is known, and it is safe. In step 204 the control layer 2 allows the viewing of the webpage 10 and all further interaction. Thus, there is no further involvement of the proposed control layer 2 until the user 14 visits another web page 10. This guarantees that the user 14 is using the safe/known websites 12 and can submit any sensitive data to these websites and perform any activity on them. In step 205 the URL 16 is found in blacklist 18. In step 206 the web page 10 is blocked. In step 207 the user 14 is informed that the web page 10 is malicious/phishing. In step 208 the URL 16 is not listed in either whitelist 20 or blacklist 18 and the web page 10 is still unknown. In step 209 additional phishing detection technique is introduced with the proposed control layer 2.

Figure 3A:
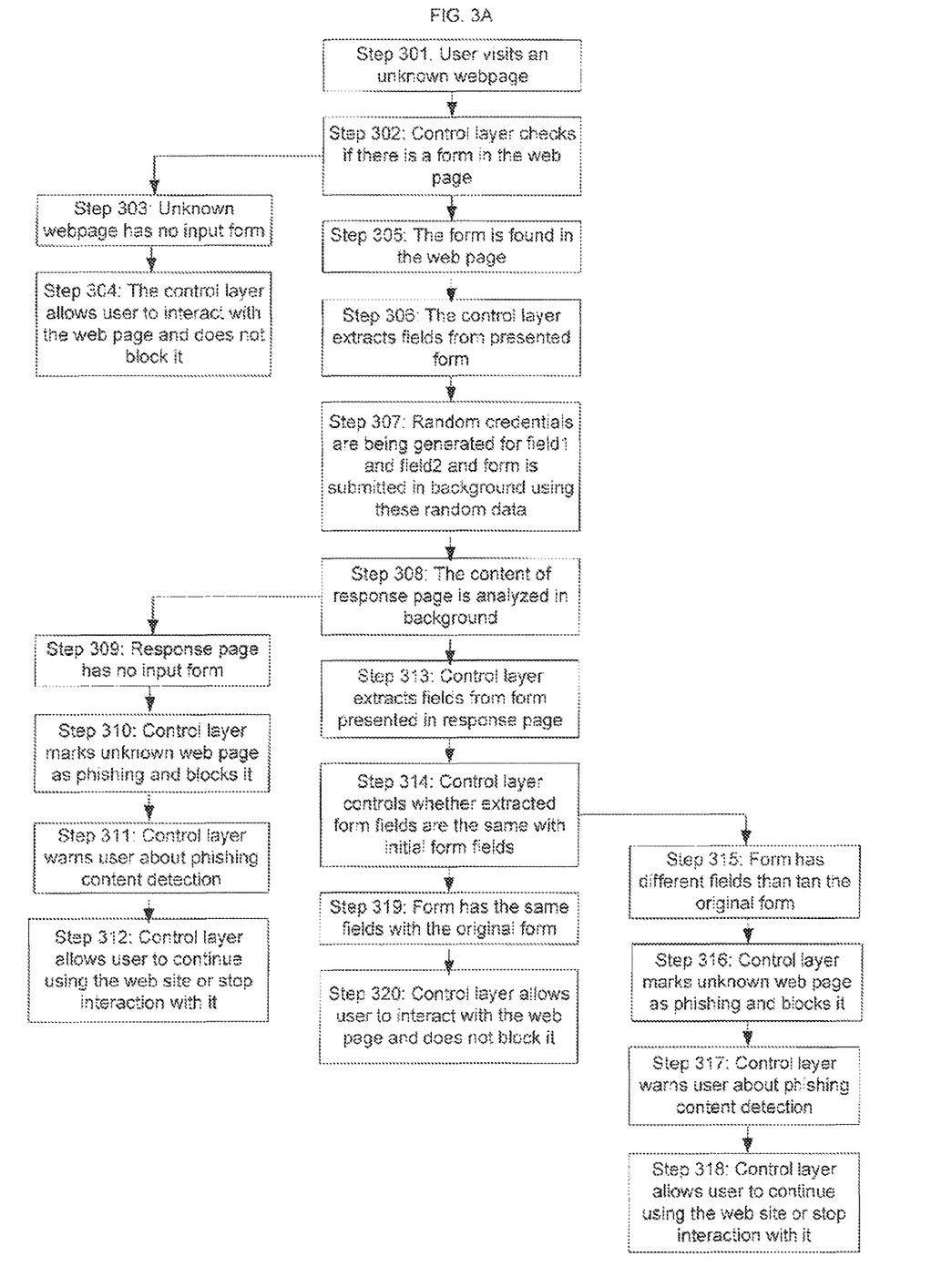
FIG. 3A is a flowchart of another embodiment of the invention where the proposed control layer detects whether visited web page is phishing or not in real-time.
Figure 3B:
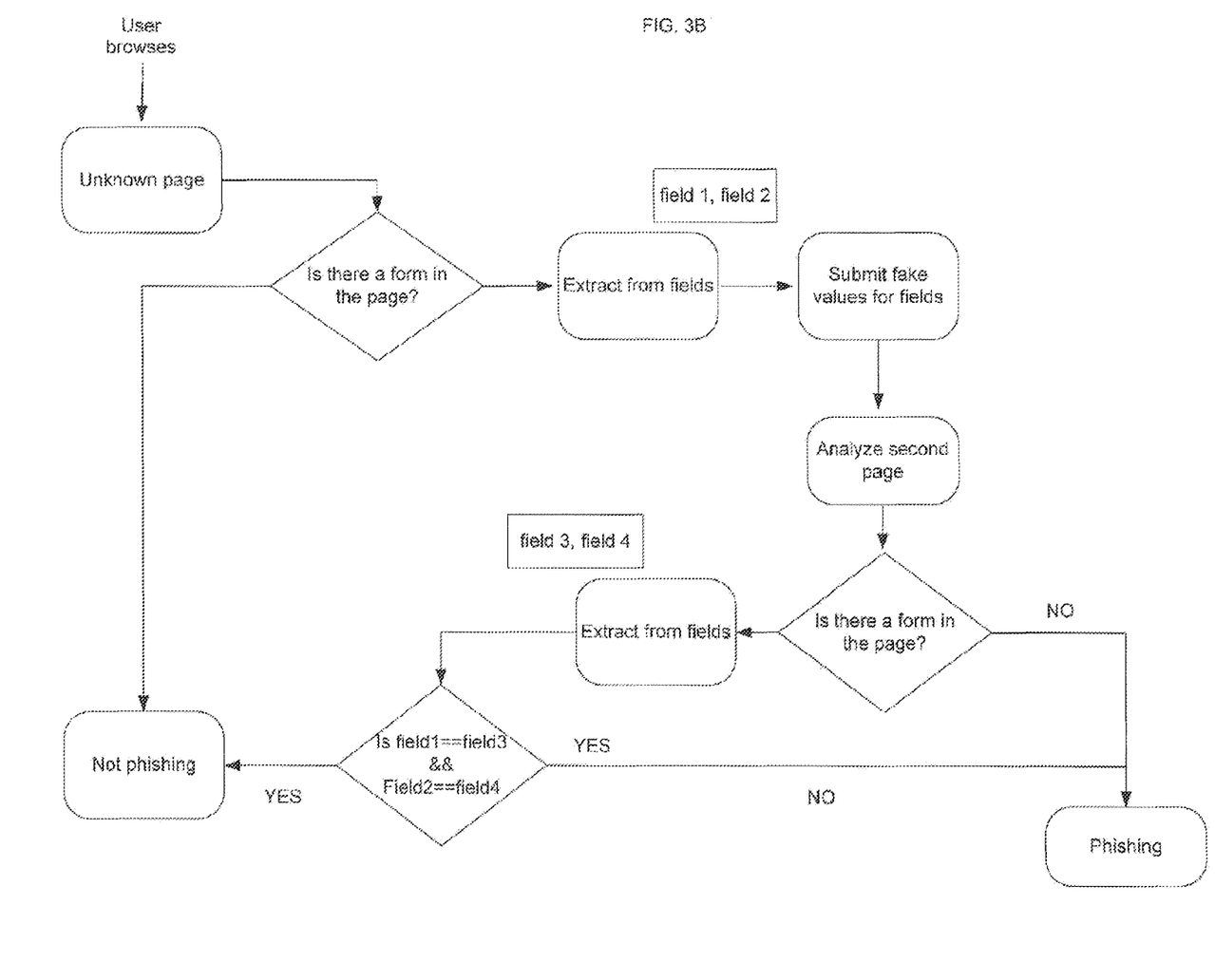
FIG. 3B is a depiction of another embodiment of the invention where the proposed control layer detects whether visited web page is phishing or not in real-time.
Figure 3C:
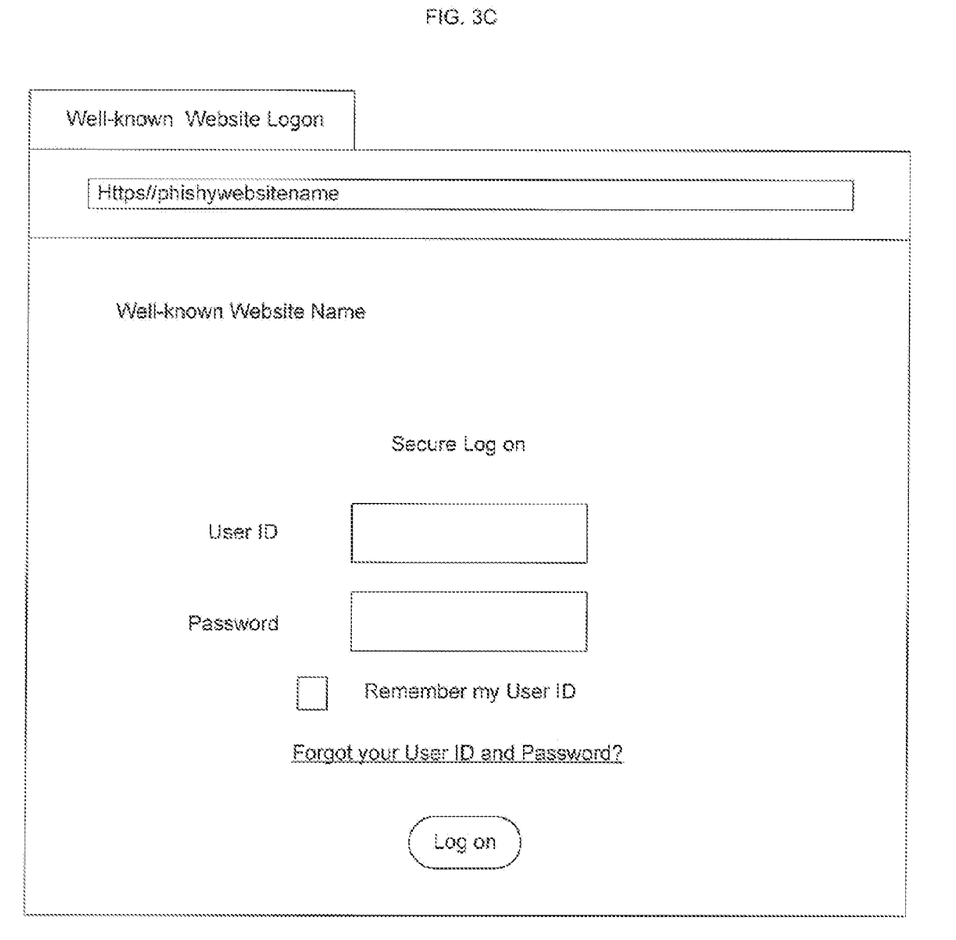
FIG. 3C is a depiction of another embodiment of the invention where submit form example is shown.
Figure 3D:
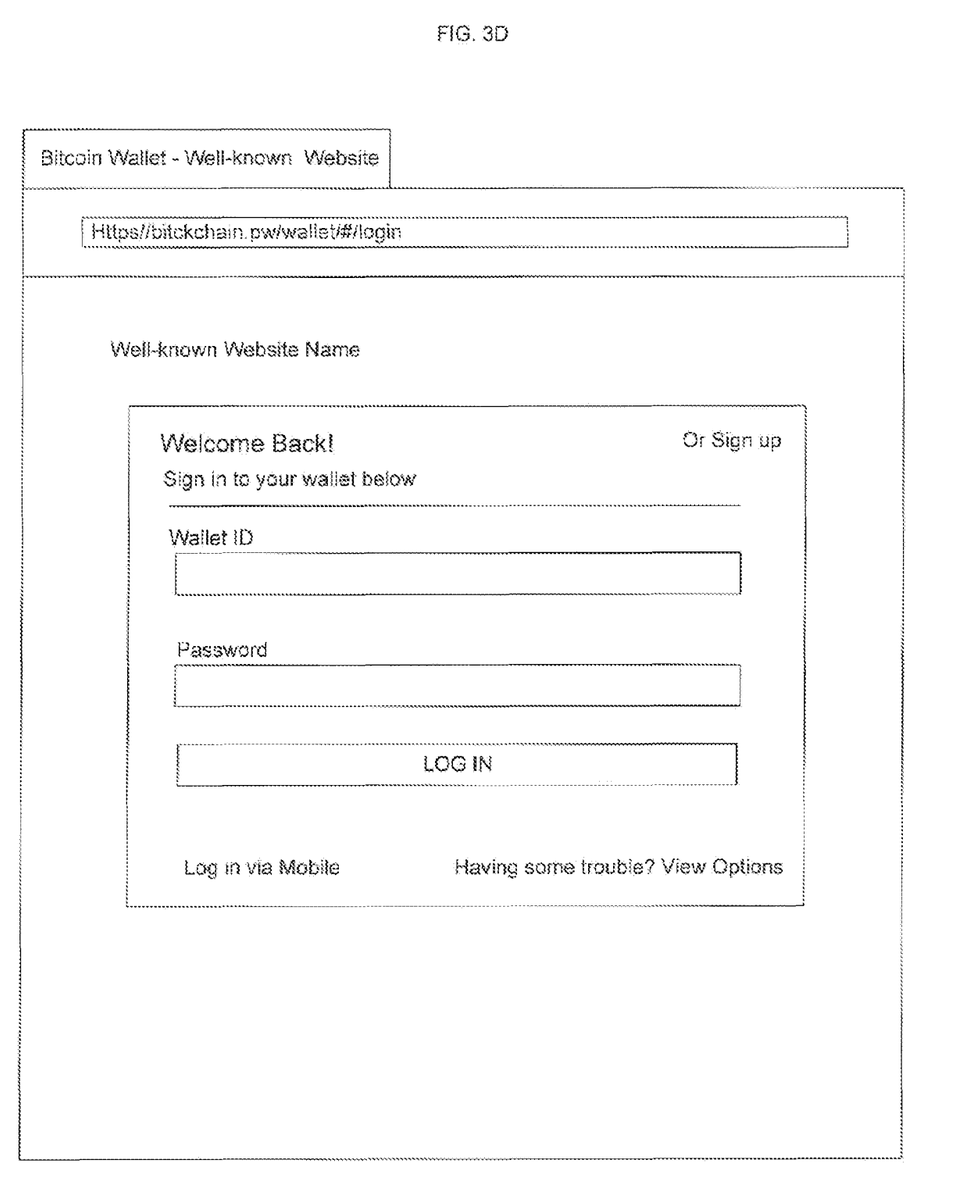
FIG. 3D is a depiction of another embodiment of the invention where submit form example is shown.

FIGS. 3A, 3B, 3C and 3D are flowchart and depictions of another embodiment of the invention where the proposed control layer 2 detects whether the visited web page 10 is phishing or not in real-time. In step 301 the user 14 visits an unknown web page 10 (web page might be safe or malicious). In step 302 the control layer 2 checks if there is a form 8 in the web page 10. The form 8 examples are shown in FIGS. 3C and 3D. In step 303 unknown web page 10 has no input form 8. In step 304 the control layer 2 allows the user 14 to interact with the web page 10 and does not block it. For this case the web page 10 is marked as not phishing. In step 305 the form 8 is found in the web page 10. In step 306 the control layer 2 extracts fields from presented form 8. As illustrated, a first field (field1) and a second field (field2) are extracted. In step 307 random credentials are being generated for a first field (field1) and a second field (field2) and form 8 is submitted in background using these random data. In step 308 a response page retrieved after form 8 submission is being collected and the content of the response is analyzed in background. It is checked whether the response web page of random credentials of submitted form includes any input form or not. In step 309 the response page has no input form 8. In step 310 the control layer 2 marks unknown web page 10 as phishing and blocks it. In step 311 the proposed control layer 2 warns the user 14 about phishing content detection. In step 312 the control layer 2 allows the user 14 to continue using the web site 12 or stop interaction with it. In step 313 the control layer 2 extracts fields from form 8 presented in the response page. In the present invention, a third field (field3) and a fourth field (field4) are extracted. In step 314 the control layer 2 controls whether extracted form fields are the same with initial form 8 fields. In step 315 form 8 has different fields than tan the original form. In step 316 the control layer 2 marks unknown web page 10 as phishing and blocks it. In step 317 the control layer 2 warns the user 14 about phishing content detection. In step 318 the control layer 2 allows the user 14 to continue using the web site 12 or stop interaction with it. In step 319 form 8 has the same fields with the original form. In step 320 the proposed control layer 2 allows the user 14 to interact with the web page 10 and does not block it.

The invention is not restricted to the details of the foregoing embodiments. The invention extend to any novel one, or any novel combination, of the features disclosed in this specification (including any accompanying claims, abstract and drawings), or to any novel one, or any novel combination, of the steps of any method or process so disclosed.

What is claimed is:

1. A system of detecting phishing websites by introducing a control layer between a user and a website to be visited, where the control layer checks whether the website, requiring sensitive information, is a phishing website by comparing input forms after false credential submission comprising:

at least one endpoint device in use by said user and in communication with a network;

said control layer is implemented as a web browser extension usable in real time while said user is browsing any website;

said user browsing said website through a web browser and interacting with said website; said website having a first input form;

a website URL being visited by said user through said web browser having said web browser extension;

said control layer deployed on said at least one endpoint device or on said network and tracking said first input form of said website being visited by said user;

a whitelist and a blacklist checked by said control layer to find out if said browsed URL is in said whitelist or in said blacklist;

a verdict that said website is safe, if said website is found in said whitelist;

said verdict that said website is malicious, if said website is found in said blacklist;

said verdict that said website is unknown if said website is not found neither in said whitelist nor in said blacklist;

said control layer allowing interaction of said user with said website by enabling a permissive functionality; and said control layer blocking access to said website and warn said user about malicious content wherein said control layer detects whether said visited website is phishing or not in real-time, said detecting comprising:

visiting unknown website by said user;

checking by said control layer if said website has the first input form;

allowing by said control layer said user to interact with said website, if unknown website has no input form; marking said website as not phishing;

extracting a first and second fields (field1 and field2) from said first input form;

generating random credentials for the first field (field 1) and the second field (field 2) and submitting said first input form in background using the random credentials if unknown website has said first input form;

analyzing in background the content of said response page retrieved after form submission;

checking whether said response page of random credentials submitted form includes any input form or not;

marking unknown page as phishing and blocking if said response page has no input form;

warning said user about phishing content detection and allowing said user to continue using said website or stop interaction with said website;

extracting by said control layer a third and fourth fields (field3, field4) from said second input form presented in said response page;

checking whether extracted from said second input from said third and said fourth fields (field3, field4) are the same with the first input form first and second fields (field1 and field2);

marking the unknown website as phishing and blocking said unknown website if the third field (field3) and the fourth field (field4) are different from the first field (field1) and the second field (field2);

warning said user about phishing content detection and allowing said user to continue using said website or stop interaction with said website; and allowing said user the interaction with said website if the third field (field3) and the fourth field (field4) are the same as the first field (field1) and the second field (field2).

2. The system according to claim 1 further comprising:

browsing said website where said website has said first input form with username and password input fields asking sensitive information;

recording said input fields;

generating and submitting false credentials for said input fields in background;

checking by said control layer whether content of a response page includes said first input form; said response page having a second input form;

checking by said control layer whether said second input form of said response page has input fields which are same as the first input form of said website, if said first input form of said website is included; and identifying said website as a phishing site, if said response page does not have said first input form of said website, or if said response page has said first input form of said website with different fields than the input form of the website.

3. The system according to claim 1 wherein said control layer triggers interaction with said website and analyzes behavior of said website before actual interaction with said user.

4. The system according to claim 1 wherein said enabling a permissive functionality includes having "Allow this website" button after the false credentials have been submitted once.

* * * * *